US012759944B2

(12) United States Patent
Besra et al.

(10) Patent No.: US 12,759,944 B2
(45) Date of Patent: Oct. 13, 2026

(54) MAX PHASES BY REACTIVE FLASH SINTERING AND A METHOD FOR ULTRAFAST SYNTHESIS THEREOF

(71) Applicant: COUNCIL OF SCIENTIFIC AND INDUSTRIAL RESEARCH, New Delhi (IN)

(72) Inventors: Laxmidhar Besra, Bhubaneswar (IN); Nuwula Usha Kiran, Bhubaneswar (IN); Bishnu Choudhary, Bhubaneswar (IN); Sriparna Chatterjee, Bhubaneswar (IN)

(73) Assignee: COUNCIL OF SCIENTIFIC AND INDUSTRIAL RESEARCH, New Delhi (IN)

( * ) Notice: Subject to any disclaimer, the term of this patent is extended or adjusted under 35 U.S.C. 154(b) by 521 days.

(21) Appl. No.: 18/566,610

(22) PCT Filed: May 27, 2022

(86) PCT No.: PCT/IN2022/050494

§ 371 (c)(1),
(2) Date: Dec. 1, 2023

(87) PCT Pub. No.: WO2022/254455

PCT Pub. Date: Dec. 8, 2022

(65) Prior Publication Data

US 2024/0262753 A1 Aug. 8, 2024

(30) Foreign Application Priority Data

Jun. 2, 2021 (IN) ............................ 202111024506

(51) Int. Cl.

| | |
|---|---|
| *C04B 35/56* | (2006.01) |
| *C04B 35/626* | (2006.01) |
| *C04B 35/65* | (2006.01) |

(52) U.S. Cl.

CPC ...... *C04B 35/5615* (2013.01); *C04B 35/6261* (2013.01); *C04B 35/62625* (2013.01);

(Continued)

(58) Field of Classification Search

CPC ........... C04B 35/5615; C04B 35/6261; C04B 35/62625; C04B 35/62655;

(Continued)

(56) References Cited

FOREIGN PATENT DOCUMENTS

| | | |
|---|---|---|
| CN | 102633505 A | 8/2012 |
| CN | 105648276 A | 6/2016 |

(Continued)

OTHER PUBLICATIONS

Cologna et al; "Flash Sintering of Nanograin Zirconia in <5 s at 850° C."; J. Am. Ceram. Soc., 93 [11]; pp. 3556-3559 (2010).

(Continued)

*Primary Examiner* — Anita Nassiri-Motlagh

(57) ABSTRACT

The present invention discloses a novel flash sintering process for synthesis of MAX phases, namely, but not limited to $Ti_2SnC$ and $Ti_3SiC_2$ in an extremely short time. The process is a combustion synthesis where a relatively low voltage in a range of 20-60 V/cm is applied using a DC/AC power source across the compact precursor material prior to ignition. The flash event is observed with a quick rise in current flow in a range of 100-300 mA/mm$^2$ followed by measured temperature range of 1200-1400° C. in a green compact body of different MAX phase compositions. The process of the present invention enables the synthesis of MAX phases in air by suppressing oxidation of the material because of the very short residence time of the flashing event. In addition, the present invention focuses on synthesis of MAX phase in bulk to serve as the starting material for the development of two-dimensional MXenes.

10 Claims, 7 Drawing Sheets

(52) U.S. Cl.
CPC .... *C04B 35/62655* (2013.01); *C04B 35/6268* (2013.01); *C04B 35/651* (2013.01); *C04B 2235/404* (2013.01); *C04B 2235/422* (2013.01); *C04B 2235/428* (2013.01); *C04B 2235/6567* (2013.01); *C04B 2235/666* (2013.01); *C04B 2235/80* (2013.01)

(58) Field of Classification Search
CPC .............. C04B 35/6268; C04B 35/651; C04B 2235/404; C04B 2235/422; C04B 2235/428; C04B 2235/6567; C04B 2235/666; C04B 2235/80
USPC .......................................................... 423/414
See application file for complete search history.

(56) References Cited

FOREIGN PATENT DOCUMENTS

| | | |
|---|---|---|
| CN | 108085529 A | 5/2018 |
| CN | 110642609 A | 1/2020 |
| CN | 110668821 A | 1/2020 |
| CN | 112316157 A | 2/2021 |
| FR | 3071255 A1 | 3/2019 |

OTHER PUBLICATIONS

Gao et al; "Dense Ti3SiC2 prepared by reactive HIP"; Journal of Materials Science 34 (1999); pp. 4385-4392.
International Search Report and Written Opinion dated Dec. 9, 2022 issued in PCT/IN2022/050494.
Kumar et al.; "Flash assisted synthesis and densification of five component high entropy oxide (Mg, Co, Cu, Ni, Zn)O at 350 ° C. in 3 min"; Journal of the European Ceramic Society; Feb. 16, 2020; pp. 1-5.
Li et al.; "Mechanical-Alloying-Assisted Synthesis of Ti3SiC2 Powder"; J. Am. Ceram. Soc., 85 [4]; pp. 1004-1006 (2002).
Qi et al.; "Preparation and magnetic properties of DC-sputtered porous HfO2 films"; Sep. 5, 2016; 5 pages.
Raj; "Joule heating during flash-sintering"; Journal of the European Ceramic Society 32 (2012) 2293-2301.
Xu et al.; "Rapid synthesis of Gd2Zr2O7 ceramics by flash sintering and its aqueous durability"; Journal of the European Ceramic Society Nov. 19, 2019; 22 pages.

MAX PHASES BY REACTIVE FLASH SINTERING AND A METHOD FOR ULTRAFAST SYNTHESIS THEREOF

FIELD OF THE INVENTION

The present invention relates to a novel approach for the synthesis of three-dimensional (3D) layered interstitial transition metal carbides and nitrides known as MAX phases by flash sintering. More particularly, the present invention is directed to develop a process for of the synthesis of the material, which is ultrafast as compared to the other conventional methods and is feasible in air, vacuum as well as in gas atmosphere.

BACKGROUND OF THE INVENTION

This present invention is pertaining to the field of chemistry and materials science for studies of very fast synthesis routes of metallic ceramics, $M_{n+1}AX_n$ (MAX) materials, in just less than 10 sec reaction.

MAX phases are a family of ternary carbides, nitrides and carbonitrides, having graphene like 2D planer microstructure with exceptional combination of metal and ceramic properties such as high electrical conductivity, high mechanical strength, high temperature resistance etc.

So far, many successful approaches have been developed for the synthesis of MAX materials, such as mechanical mixings [Li Jing-Feng et al., *J. Am. Chem. Soc.* 85, 4 (2002): 1004-1006], pressure-less sintering [CN110668821A], conventional Self-Propagating High-temperature Synthesis (SHS) or sintering [CN112316157A, CN110642609A], spark plasma sintering/synthesis (SPS) [CN108085529A, CN105648276A], hot pressing (HP) or hot Isostatic pressing (HIP) [*J. Materials Sci.* 34, 18, (1999), 4385-4392], microwave sintering (MS) [CN102633505A], flash sintering (FS) [*J. Am. Chem. Soc.* 93, 11 (2010), 3556-3559; *J. Eur. Ceramic Soc.* 32, 10 (2012), 2293-2301; FR3071255A1; *J. Eur. Ceramic Soc.* 40, 4 (2020), 1620-1625; *J. Eur. Ceramic Soc.* 40, 8 (2020), 3358-3362] and they are traversed hereunder.

References may be made to article *J. Am. Chem. Soc.* 85, 4, 2002, 1004-1006, wherein efforts were made to synthesize $Ti_3SiC_2$ from Ti, Si, C elemental powders using mechanical alloying using large size balls, which triggered the combustion reaction towards the formation of $Ti_3SiC_2$. The mechanical alloying was assisting the combustion reaction to get the desired phase in few hours of ball milling process.

References may be made to CN110668821A, wherein pressure-less sintering for synthesis of MAX materials is disclosed. Synthesis of highly dense (98%) $Cr_2AlC$ MAX phase is achieved following pressure-less sintering technique at a temperature range of 1350-1400° C. for 30-60 min, which is good to enlarge the application range of MAX phase ceramic materials. Another researcher invented the preparation method of $Nb_4C_3T_X$ MXene film from layered ternary ceramic powder $Nb_4AlC_3$ using pressure-less sintering method at a very high temperature range of 1500-1650° C. for 4-6 h. This concludes that for the fabrication of 2D MXene nanosheet, synthesis of corresponding MAX phase is much more important. Similarly, the MAX phase $Ti_3SiC_2$ was synthesized by mixing the precursors in tubular shaker mixture for 1 h and compacted uniaxially at 200 MPa to obtain discs of 16 mm diameter and 3 mm thickness and green compacted pellets were heat treated in an alumina crucible with heating and cooling rate of 5° C./min up to the selected heat treatment temperature (1000-1400° C.) for few hours in vacuum atmosphere. They obtained $Ti_3SiC_2$ of 94% purity at an optimized condition of 1300° C. for 6 h.

References may be made to CN112316157A, wherein Self-Propagating High-temperature Synthesis (SHS) or sintering approach reported by He et al. The disclosed invention describes a synthesis method for the preparation of an antioxidant MXene material loaded with rapamycin and paclitaxel medicaments in the field of biotechnology. For this, they took the reactant powders of Ti, TiC and Al in a mass ratio of 1:2:1 followed by sintering at a temperature of 1380° C. for 2 h to form $Ti_3AlC_2$ MAX phase.

References may be made to CN110642609A, wherein high-density, oxidation resistant alumina/MAX phase ceramic composite has been prepared. The invention adopts the conventional preparation process where alumina and raw Ti, Si and C powders were mixed to form in-situ alumina/$Ti_3SiC_2$ MAX phase composite at a temperature range of 1200-1600° C. for 0.5-4 h. Other researchers have reported a synthetic approach to Ti—Al—C system where stoichiometric amount of precursor powders mixed and milled for 2 h and uniaxially pressed in pellet form with relative density of 60%. Combustion reaction (ignition) on pressed powders was carried out in argon atmosphere by a graphite plate heated by applying a high current (up to 12 V-200 A) which generated a temperature of about 1730° C. By optimizing materials composition and cooling condition, they could reduce the impurity level up to 2% of TiC. Further, they claim that high cooling rate may affect the purity of phase. However, cooling rate is a difficult parameter to control in that process.

References may be made to CN108085529A, wherein spark plasma sintering/synthesis route is adopted for preparation of the MAX phase reinforced Zr—Ti—Al—V alloy. The disclosed invention synthesized $Ti_3AlC_2$ MAX phase by SPS route. Essentially, the stoichiometric amount of Ti, Al and C precursor powders were ball milled for few hours under protective argon environment and compacted in die followed by sintering at high temperature (usually from 1100-1400° C.) using SPS apparatus in vacuum or inert medium for dwell time of around 10 minutes.

References may be made to CN105648276A, wherein composite material, especially a Ni-based alloy/ternary layered MAX phase ceramic material is obtained by spark plasma sintering. The inventors claimed that the composite material shows a wear rate of 10-5 $mm^3$/Nm, which is far less than the wear rate of Ni-based high temperature alloy. Very recently, Pourebrahim et al summarized that 'Si' content plays a key role in the enhancement of $Ti_3SiC_2$ MAX phase purity. The author concludes that high-purity $Ti_3SiC_2$ could be achieved though the elemental composition of Ti:Si:TiC:Al=1:1.2:2:0.2 at 1150° C. However, impurity is still the concern that needs to be avoided during synthesis/sintering steps. Other researchers have explored the properties of MAX phases in application as structural composites. The influence of processing parameters such as milling time of raw materials, SPS temperature on the microstructural aspects, tribological and mechanical properties of $Cr_2AlC$ MAX phase concluded that the sample milled for 8 h and SPS processed at 1100° C. contains highest MAX phase content (97.2%) and exhibit the best wear performance.

References may be made to article *Journal of materials science* 34, 18, 1999, 4385-4392 wherein Hot isostatic pressing (HIP) or hot pressing (HP) were employed for the synthesis of different MAX phases. They synthesized $Ti_3SiC_2$ using Ti, β-SiC and graphite powders mixed according to the molar ratio of 3Ti—Si-2C and ball milled for 24 h in ethanol medium. Ball milled powders were dried and shaped in green body at 200 MPa. The shaped green body was vacuum sealed into pyrex glass capsule in BN powder bed and capsule was placed in graphite die and HIP processed under various condition of temperature (1300-1600° C.), pressure (40-100 MPa) and dwell period (0.5-4 h). They revealed that highest $Ti_3SiC_2$ content of about 97 vol % was obtained when treated at 1500° C., 40 MPa for 30 min. A group of researchers recently invented a preparation method of graphene-copper composite material by hot pressing, where they used MAX phase ceramic to improve the interfacial bonding and compatibility between graphene and copper. The composite material with excellent mechanical performance and ductility was obtained at an optimum condition of pressure of 10-50 MPa, and temperature of 900-1150° C. for 20-60 min.

References may be made to CN102633505A, wherein high-purity MAX phase is prepared by ceramic powder following microwave sintering technique. The process involves the mixing of raw materials by ball-milling and the powder was pre-compressed at a pressure of 5-150 MPa followed by microwave sintering at a temperature of 1000-1700° C. in an inert atmosphere. Other researchers also reported the synthesis of quaternary $V_4AlC_3$ MAX phase by susceptor-assisted microwave heating. The ratio of elemental powders V, Al and C in 4:5.2:3 with a heating process for 30 min and 60 min at a maximum microwave power of 1000 W were used for the synthesis of $V_4AlC_3$ MAX phase.

References may be made to articles Journal of the Am. Ceramic Soc. 93, 11, 2010, 3556-3559 & *J. Euro. Ceramic Soc.* 32, 10, 2012, 2293-2301, which describes flash assisted sintering/synthesis as a method that involves the application of external (DC/AC) electric field to the compacted green samples with simultaneous heating in furnace. Heating temperature of furnace is much lower as compared to conventional synthesis temperature while the flashing phenomena is of very short duration (few seconds) because of joule heating effect.

References may be made to FR3071255A1, wherein the inventors developed a turbine part such as turbine blade or distributor fin, comprising of a polycrystalline substrate having at least one $Ti_3AlC_2$ MAX phase. In the manufacturing process, the reactive sintering of elemental Ti, Al and C was first carried out under a protective atmosphere for 2 h at 1450° C. Finally, flash sintering (spark plasma sintering) was implemented at a temperature of 1360° C. for 2 minutes at 75 MPa for densification of the alloy material comprising of 96% $Ti_3AlC_2$ MAX phase, 3% alumina and 0.8% TiC.

References may be made to article *J. Eur. Ceramic Soc.* 40, 4 (2020), 1620-1625, wherein Gadolinium zirconate ($Gd_2Zr_2O_7$), which is refractory in nature, was synthesized successfully using flash assisted sintering at 1050° C. within 60 sec under an applied electric field of 100 V/cm in contrast to the conventional synthesis method that needs ≥1500° C. for longer dwell time (>70 h).

References may be made to article *J. Eur. Ceramic Soc.* 40, 8 (2020), 3358-3362, wherein attempts were made to synthesize five component high entropy oxides (Zn, Cu, Co, Ni, Mg) O at 350° C. by applying an electric field (DC/AC) of 100 V/cm across the samples for 3 min. These studies indicate that flash assisted synthesis/sintering routes have potential to deliver high quality bulk materials in short span of time for industrial applications.

All the developed conventional methods need temperature above 1100° C. in environment protection chambers to minimize the level of impurities. Apart from that, all these methods require more time, more electrical power, high cost as well as high level of sophistications. Therefore, there is a need for development of quick, simple and easy synthesis methods with low level of sophistications to reduce cost.

The present invention discloses the synthesis of pure MAX phase in a single step by flash sintering.

The invention is very economical, easy to scale up and require simple setup for the synthesis of variety of MAX materials at low external thermal energy input (150-400° C.) in a few seconds of reaction time.

The invention also provides a rapid and cost-effective synthesis of various MAX phase materials using flash sintering technique with a very simple experimental setup as shown in FIG. 1.

OBJECTIVES OF THE INVENTION

The main objective of the present invention is therefore, the use of flash sintering technique for the synthesis of transition metal carbides, nitrides or carbonitrides, known as MAX phases having general formula $M_{n+1}AX_n$, where, 'M'=An early transition metal (Sc, Ti, Zr, Hf, V, Nb, Ta, Cr, Mo and so on), 'A'=Group 13 & 14 elements (Al, Ga, In, Tl, Si, Ge, Sn, Pb, P, As, S) and 'X'=Carbon and/or Nitrogen. Some non-limiting examples of MAX phases include $Ti_2SnC$, $Ti_3AlC_2$ and $Ti_3SiC_2$.

Another objective of the present invention includes the synthesis of other MAX phases but not limited to examples such as $Cr_2AlC$, $Zr_2SnC$, $V_4AlC_3$ etc., or a combination thereof using flash sintering technique.

Yet another objective of the invention is to synthesize MAX phases in air, in vacuum as well as in inert atmosphere such as argon, nitrogen etc. and a combination thereof.

Yet another objective of the present invention is to decrease the total time of MAX phase synthesis to about 15 hours from about 40 hours in conventional wet milling followed by sintering process.

SUMMARY OF THE INVENTION

The present invention, as compared to the other conventional techniques like spark plasma sintering, hot pressing, arc melting, magnetron sputtering, chemical vapour deposition (CVD) and self-propagating high temperature synthesis (SHS), represents a very novel technique referred to as "Flash Sintering", also known under the acronyms SPS (Spark Plasma Sintering) and FAST (Field-Activated Sintering Technique) for the synthesis of three-dimensional (3D) layered transition metal carbides, nitrides and carbonitrides, known as MAX phases in an extremely short time. The motivation for ultrafast synthesis of MAX phases is driven by the need for fabrication of MXenes, the extraordinary layered 2D materials that are fast evolving with tremendous potential for application in the field of energy storage including super capacitors, lithium-ion batteries, oxygen evolution reaction, electromagnetic interference shielding, water purification, electrolysis, electrocatalysis, medicine, fuel-cell and transparent coatings etc. Synthesis of phase pure MAX phase is very pertinent as it is a starting material for the development of nano-laminar meta-materials MXene. Flash sintering is an electrical field-assisted consolidation technology in which a DC or AC potential is applied to a compact powder, sandwiched between two electrically conductive electrodes (typically graphite) and heated in a conventional furnace during reactive sintering.

Yet another embodiment of the present invention relates to synthesis of $Ti_2SnC$ and $Ti_3SiC_2$ MAX phases using elemental powders. The precursor elemental powders are wet-milled for 12 hours in ethanol to break down the agglomerates and for their homogeneous mixing. The milled powder mixture is dried and compacted at room temperature into cylindrical pellets and sandwiched in between two graphite electrodes. It is then introduced into an electric furnace and heated up. The two electrodes are connected to a DC/AC power source for application of an electric field and to record the electrical parameters. A potential of 20-60 V/cm is applied for the synthesis of $Ti_2SnC$ or $Ti_3SiC_2$ MAX phase, separately. The flash event (FE) takes place for extremely short time i.e., for ≤10 seconds at low external thermal energy input in a range of 200° C. to 400° C. The sintered pellet looks grey in colour and can be easily pulverized into loose, grainy powders. In yet another embodiment of the present invention, the elemental powders of Ti, Sn and C are taken in a molar ratio of 2:0.2-1:1 for the synthesis of $Ti_2SnC$. For the synthesis of $Ti_3SiC_2$, elemental powders of Ti, Si and C are taken in a molar ratio of 3:1-1.8:2.

In yet another embodiment of the present invention, the synthesis of MAX phase is carried out in a fabricated chamber with air or vacuum or in inert atmosphere (Ar or $N_2$).

In yet another embodiment of the present invention, the contact between the pellet and the electrodes must be flat and proper in order to produce the flashing event.

Another embodiment of the present invention reveals that the particle size of the precursor elemental powders plays an important role in determining the purity of MAX phase formed.

Still another embodiment of the present invention reveals that the current flow within the specimen during flash event varies within a range of 100-300 mA/mm$^2$ with a heating rate of about 300° C./sec for the synthesis of MAX phases.

DETAILED DESCRIPTION OF THE INVENTION

Figure 1:
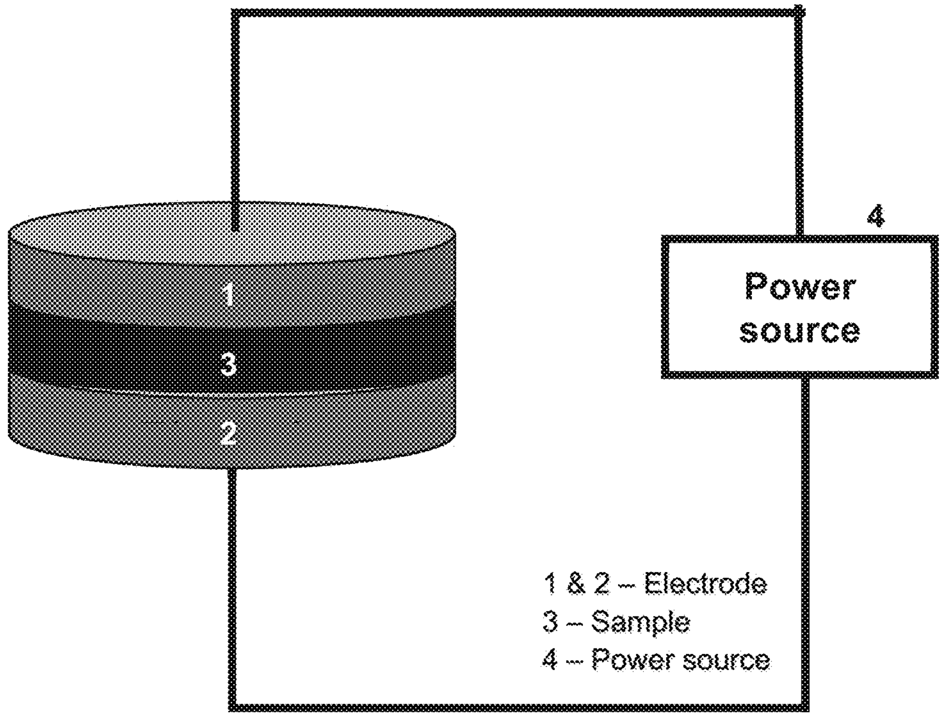
FIG. 1 is an illustration of an experimental setup of flash sintering technique

It will be apparent that the foregoing description of the specific embodiments will be appreciated by those skilled in the art without departing from the spirit of the invention and therefore, such adaptations and modifications should and are intended to be comprehended within the meaning and range of equivalents of the disclosed embodiments. It is to be understood that the terminology employed herein is intended to cover modifications within the spirit and scope of the present invention as defined by the appended claims.

The present invention relates to synthesis of ternary carbides, nitrides and carbonitrides called MAX phases in an extremely short time by exposing pellets pressed from a mixture of precursor powders to high temperature in air or vacuum or in gas atmosphere via a novel approach known as "Flash sintering". MAX phases are three-dimensional (3D) nano-layered, hexagonal, machinable ternary carbides/nitrides with a combination of both metallic and ceramic properties. Generally, these are synthesized from an early transition metal 'M' (Sc, Ti, V, Mo, Zr etc.), a post-transition metal or metalloid 'A' (Group-13 & 14 elements) and a non-metal 'X' (C or N) having a general chemical formula of $M_{n+1}AX_n$. Depending on their 'n' value, MAX phases are mainly classified into three categories: $M_2AX$ type, $M_3AX_2$ type and $M_4AX_3$ type. The recent discovery of two-dimensional nano-material called "MXenes" which is fast evolving with tremendous potential for application in the field of energy storage, electromagnetic interference, shielding, water purification, electrolysis, medicine etc. can be fabricated from MAX phase only, for which synthesis of latter is even more valuable. The synthesis of variety of compositions of MAX phases with more than 155 members have been reported so far. Preferred MAX phases include $Ti_2SnC$, $Ti_3AlC_2$, $Ti_3SiC_2$, $Zr_2AlC$, $V_4AlC_3$ etc.

Pursuant to the present invention, the first step in this process can be employed in preparing the mixture of elemental powders of a transition metal species, a co-metal species and a non-metal species as the starting material, followed by wet-milling at a particular molar ratio. A mixing time of about 12 hours in a roll-mill or ball-mill will typically provide a homogeneous mixture of powders suitable for use in the inventive process. Individual powders in the mixture typically possess average particle size of about 1 μm to 250 μm with greater than 98% purity.

In accordance with one particularly preferred embodiment of the present invention, the mixture of powder material is compacted or compressed uniaxially to form a cylindrical green pellet having a desired relative density for combustion synthesis. A uniaxial pressure of about 5-30 MPa is preferably applied onto the mixture for the formation of green pellet. A compatible binder may optionally be added to the powder mixture to provide some cohesiveness in making up the green pellet.

The green pellet is exposed to high temperature and pressure (optional), simultaneously in an inert atmosphere or in vacuum. Under these optimized conditions, the mixture of powder materials react with each-other exothermally with a significant evolution of heat, forming MAX phase with inherent presence of an auxiliary phase. Several techniques like hot-isostatic pressing (HIP), vacuum hot pressing (HP), spark plasma sintering (SPS), self-propagating high temperature synthesis (SHS) etc. have been employed for the synthesis of MAX phase. However, it is understood that these techniques are complex, expensive and time consuming. MAX phases, because of their excellent metal-ceramic properties and serving as the starting material for the fabrication of the two-dimensional nano-material "MXenes", it is imperative to develop simpler methods for their synthesis in bulk. In accordance with the present invention, the green body is subjected to an electric field applied across the sample, which is sufficient to promote the propagation of combustion process termed as "Flash Sintering". It can be defined as a field assisted sintering technique characterized by a very rapid flow of current within the specimen, followed by light emission, a drop in electrical resistivity and a quick increase in temperature of the specimen by Joule effect. The experimental setup for this novel technique comprises of the following:

(i) an electric furnace for supply of external heat to the specimen;

(ii) a chamber for the combustion synthesis in an inert atmosphere or in vacuum;
(iii) a power source for application of electric field to the specimen; and
(iv) two electrodes for holding the specimen.

In the experimental setup as shown in FIG. 1, the positive and negative terminals of DC/AC power supply are connected to the two flat graphite electrodes, respectively. The green pellet is sandwiched between the two flat electrodes to ensure a good contact. In order to improve the contact between the specimen and the electrodes, a conductive paste (i.e., Silver/Platinum paste) may be used. It would be advantageous to use the lowest voltage for ignition of the precursor material for which pre-heating of the green pellet is a much-needed act. The heat-energy supplied externally to initiate the reaction via an electric furnace varies in a range of about 200° ° C. to 400° C., to ensure a complete evaporation of water used in binder before the application of the electric field. The voltage applied across the green pellet through a DC/AC power source is in a range of 20-60 V/cm. A strong light emission is observed confirming the flash event with a quick increase in current flow and temperature with a heating rate of about 300° C./sec within the specimen. The localized temperature of the pellet is measured to be in a range of 1200-1400° C. using an optical pyrometer or a thermocouple. Current in a range of 100-300 mA/mm$^2$ is used for the formation of different MAX phases. Because of very short reaction time, there is no noticeable change in sample dimension during formation of MAX phases unlike that observed in SHS synthesis method.

Figure 2:
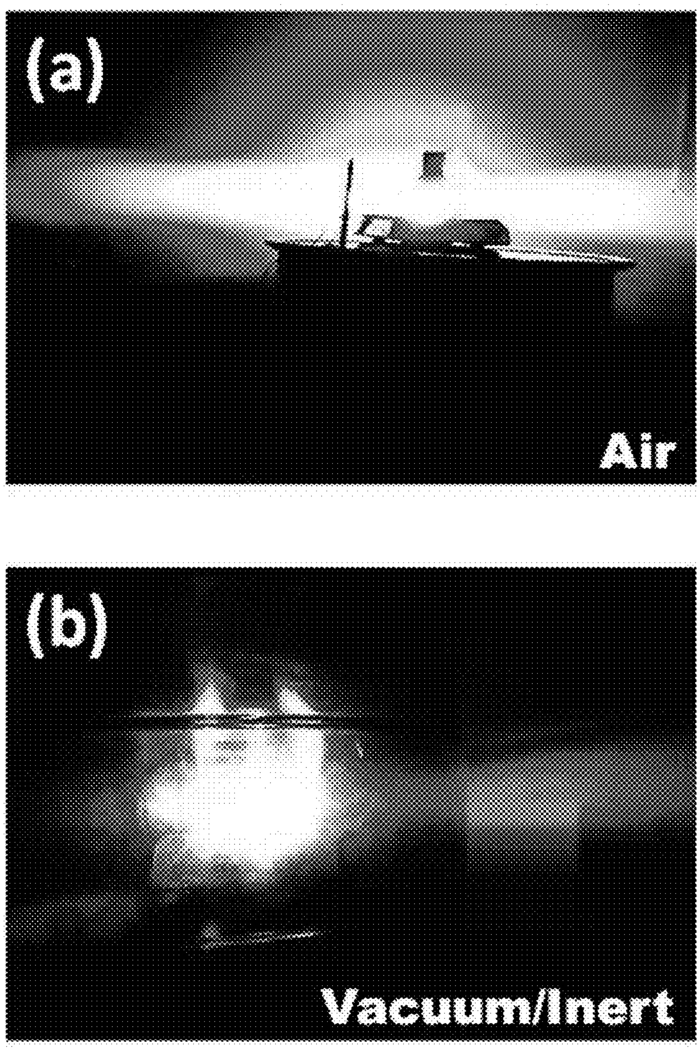
FIG. 2 depicts photographic images of flashing event of the sample in (a) air and (b) vacuum/inert.

The present invention demonstrates the synthesis of MAX phases in air, vacuum and in an inert atmosphere (especially argon) using an electric furnace for external heat supply (FIG. 2). Several conventional techniques reported the synthesis of MAX phase only in vacuum or in an inert atmosphere (Ar, $N_2$, $H_2$ etc.). However, as stated in a particular embodiment of the present invention, the synthesis of MAX phases can be carried out in air too. A very short residence time of the flashing event dramatically increases the formation of MAX phase by suppressing the oxidation of material both at low and high temperature.

In an aspect, the present invention discloses a process for synthesis of a dense and pure MAX phase, comprising the following steps: a) forming a mixture of a transition metal (M), a post-transition metal (A) and a non-metal (X) in a certain stoichiometric ratio, wherein the transition metal is titanium, wherein the post-transition metal is selected from tin and silicon, wherein the non-metal is carbon; b) wet-milling the mixture in a solvent followed by vacuum drying to form a compact disc; c) igniting exothermally the compact disc sandwiched between two flat graphite electrodes, to initiate combustion on an application of current having an electric field is in a range of 20-60 V/cm, thereby promoting propagation of the combustion in an extremely short time; d) terminating the application of current to obtain the MAX phase; wherein the MAX phase is a three-dimensional (3D) layered transition metal carbides or nitrides or carbonitrides.

In a feature of the present invention, the mixture has a M:A:X molar ratio of about 2:0.2-1.0:1 for synthesis of $Ti_2SnC$ as MAX phase.

In a feature of the present invention, the mixture has a M:A:X molar ratio of about 3:1.0-1.8:2 for synthesis of $Ti_3SiC_2$ as MAX phase.

In a feature of the present invention, a pressure of about 5 MPa to 30 MPa is employed onto the mixture to form a compact disc.

In a feature of the present invention, pre-heating of the compacted disc is done in a range of 200-400° C.

In a feature of the present invention, the application of current is in a continuous mode and is in an optimized range of 100-300 mA/mm$^2$.

In a feature of the present invention, temperature of the compact disc during flash event is about 1200-1400° C. and duration of the flash sintering process is less than 10 seconds.

In a feature of the present invention, the process is conducted in vacuum, or in an atmosphere of an inert gas.

In a feature of the present invention, the process is conducted in air without oxidation of the transition metal, a post-transition metal and a non-metal.

In a feature of the present invention, the MAX phase formed is grey in colour and is easily pulverizable.

The invention can be better understood with the following examples, which is intended for the purpose of illustration only and are not to be construed as a limitation thereon.

EXAMPLES

Following examples are given by way of illustration, and therefore should not be construed to limit the scope of the invention.

Example-1

The materials used in this example were elemental powders of titanium (99% purity, John Baker Inc., Colorado, USA), tin (60 mesh, 99% purity, Central Drug House Pvt. Ltd., India) and graphite powder (150 mesh, 99.5% purity, Central Drug House Pvt. Ltd., India) as precursor materials. The powder materials were mixed in a stoichiometric ratio of 2:0.2-1:1 of Ti:Sn:C, and wet-milled for 12 hours in ethanol using 2 mm zirconia balls. The milled powder was then vacuum dried, and a green cylindrical compact disc was formed.

Figure 3:
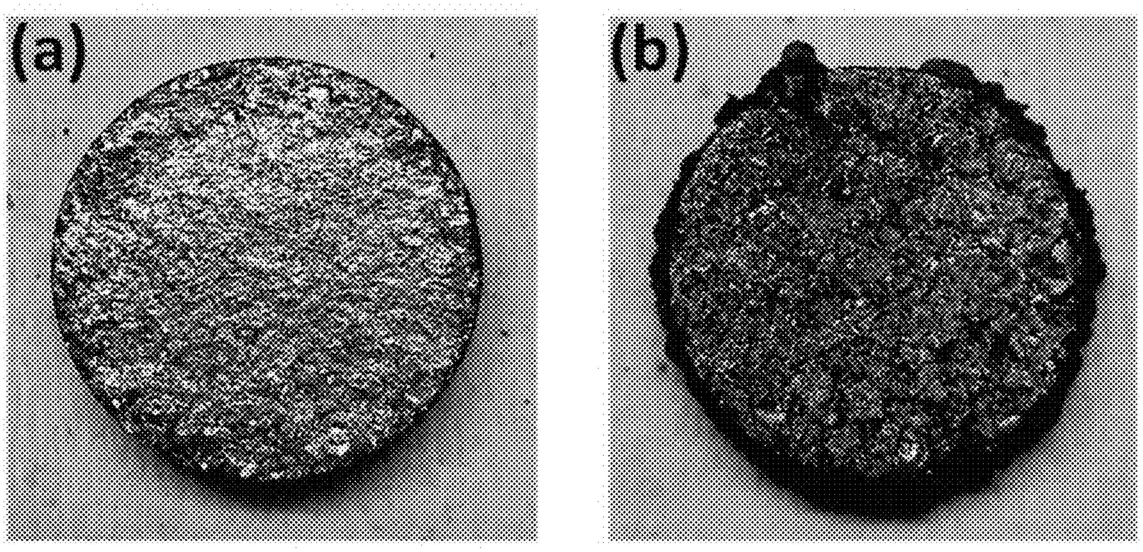
FIG. 3 depicts photographic images of Ti/Sn/C compact mixture (a) before flash sintering and (b) after flash sintering

The resulting compact pellet was sandwiched between two flat graphite electrodes. The electric field of 20-45 V/cm was applied using a DC/AC power source followed by pre-heating of the compact powder at 300° C. During the flashing event, the material gets ignited showing a quick increase in current up to 150 mA/mm$^2$ with strong emission of light. Application of voltage was then terminated. The temperature of the compact pellet during flash event was measured to be about 1200° C. by an optical pyrometer. The resulting product was single phase $Ti_2SnC$, with a minor amount of TiC as an auxiliary phase. A trace amount of ‘Sn’ metal powder was also present in the final product. This experiment was carried out in both air as well as in vacuum inside a vacuum chamber to ensure the formation of MAX phase. The photographic image of the compact powder before and after sintering has been shown in FIG. 3 which represents that the reaction has occurred.

Figure 4:
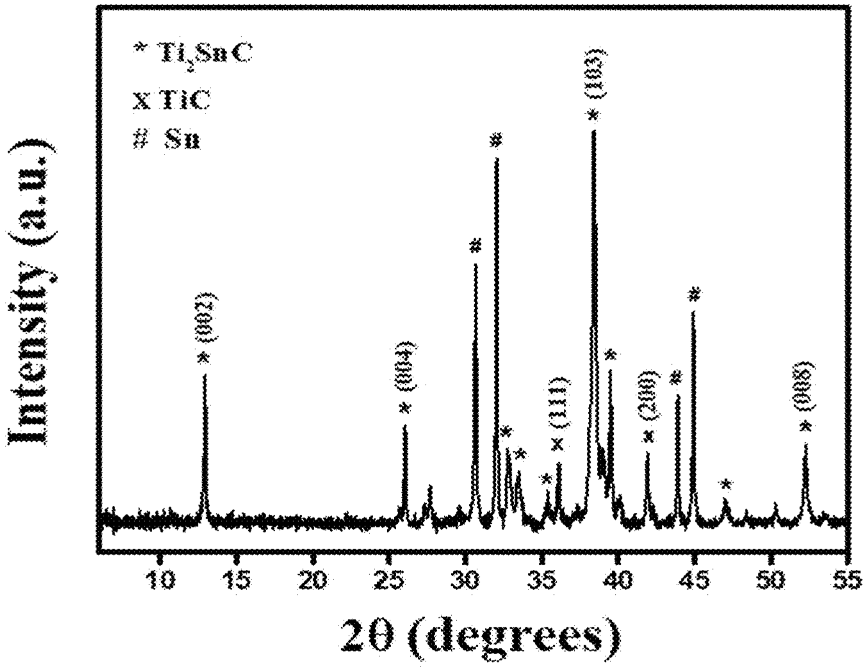
FIG. 4 depicts X-ray diffraction pattern of $Ti_2SnC$ MAX phase
Figure 5:
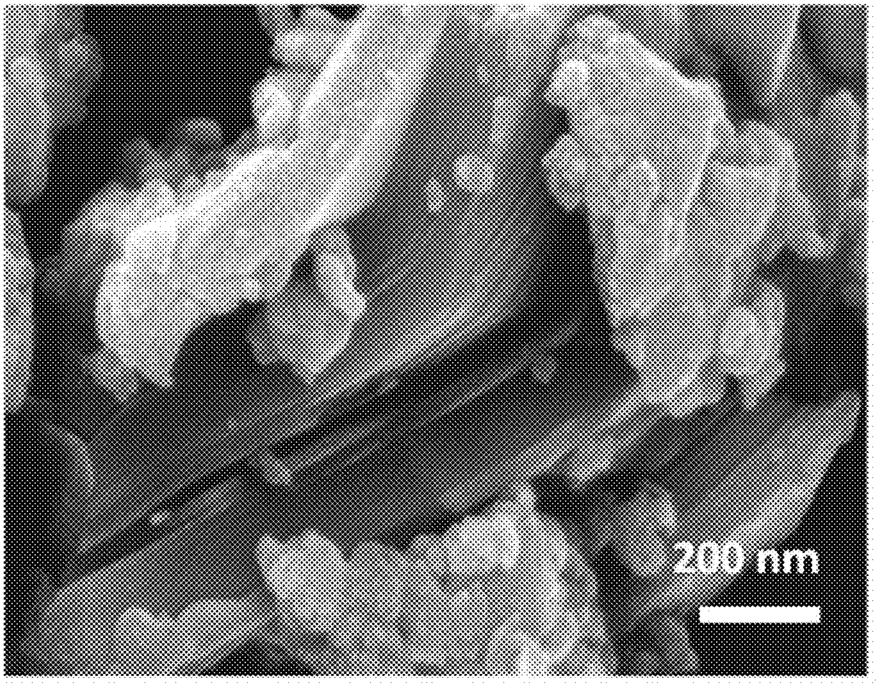
FIG. 5 depicts FESEM image of compact layered $Ti_2SnC$ MAX phase with EDAX analysis (Inset).

An X-ray diffraction study ascertained the crystallinity and phase purity of the sample. The X-ray diffractograms of $Ti_2SnC$ MAX phase is presented in FIG. 4. The presence of diffraction lines at 2θ~12.9°, 26°, 38.4°, and 39.5° confirms the formation of pure $Ti_2SnC$ MAX phase (JCPDS ref. code: 01-089-5590). The presence of TiC as an auxiliary phase is also observed in the sample (2θ=35.9° and 41.8°). An additional peak of unreacted ‘Sn’ is also apparent from the XRD pattern. FIG. 5 represents the FESEM image of pure $Ti_2SnC$ MAX phase which exhibits stacked and compacted plate-like morphology. Elemental analysis of the sample was done using EDAX spectroscopy revealing the presence of Ti, Sn and C in different atomic and weight percentages (Inset).

Example-2

Figure 6:
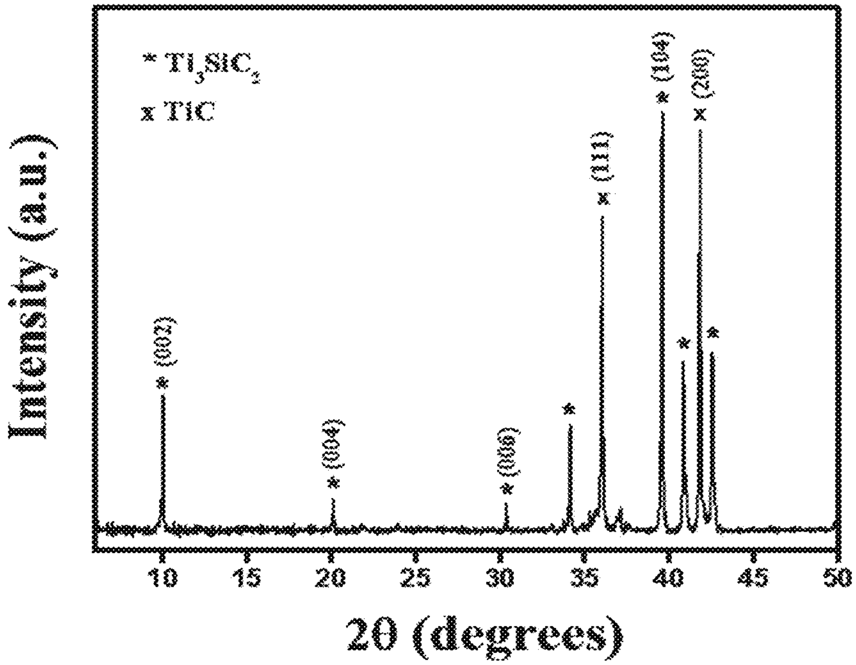
FIG. 6 depicts X-ray diffraction pattern of $Ti_3SiC_2$ MAX phase.
Figure 7:
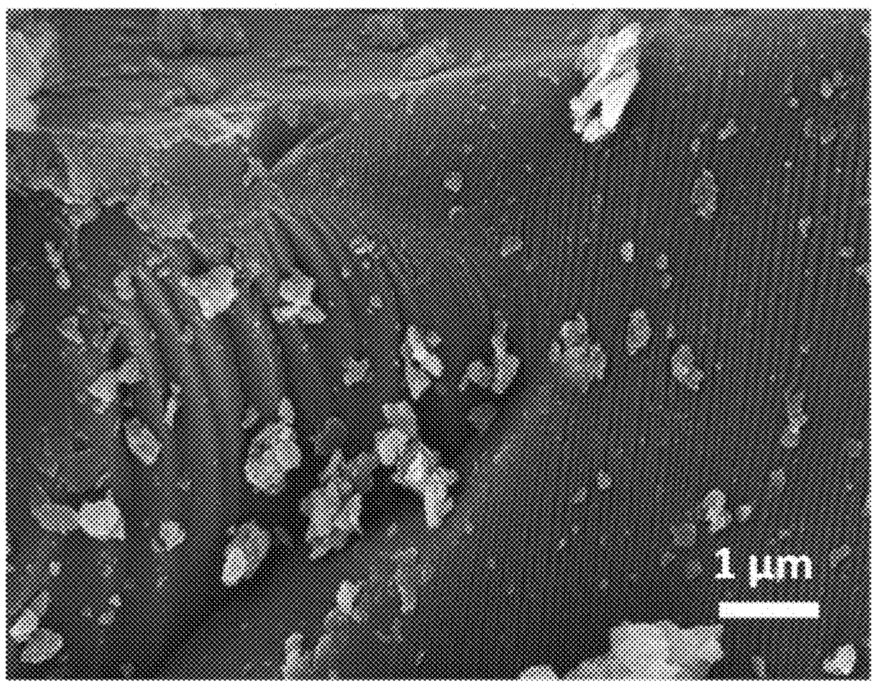
FIG. 7 depicts FESEM image of compact layered $Ti_3SiC_2$ MAX phase with EDAX analysis (Inset).

A mixture of elemental powders of titanium, silicon (60 mesh, 99% purity, Central Drug House Pvt. Ltd., India) and graphite powder was prepared in a stoichiometric ratio of 3:1-1.8:2 with the replacement of tin with silicon metal powder as depicted in Example-1. A green pellet was prepared and electrified with an applied voltage in a range of 25-55 V/cm, followed by pre-heating of the specimen at about 300° C. During the flashing event, the current was measured to be about 220 $mA/mm^2$ and the temperature of the sample was measured to be about 1400° C. The product was primarily $Ti_3SiC_2$ MAX phase along with TiC which can be confirmed from the XRD analysis in FIG. 6. The diffraction lines of $Ti_3SiC_2$ MAX phase are in accordance with the JCPDS reference no.: 03-065-3559. The presence of TiC during the synthesis of $Ti_3SiC_2$ MAX phase can be either an intermediate product prior to the formation of $Ti_3SiC_2$ MAX phase or a result of its decomposition. The layered crystalline characteristics of synthesized $Ti_3SiC_2$ MAX phase can be seen in FIG. 7 with elemental analysis (EDAX) (Inset) confirming the elemental composition of $Ti_3SiC_2$ MAX phase.

Advantages of the Invention

1. Use of a novel, simple and cost-effective sintering technique for the synthesis of pure MAX phase.
2. Synthesis of major MAX phases include but not limited to examples such as $Ti_2SnC$, $Ti_3SiC_2$, but includes different MAX phases like $Zr_2AlC$, $V_4AlC_3$, $Ti_3AlC_2$ etc.
3. This technique delivers dense, crystalline and pure MAX phase in extremely short time in comparison to other conventional techniques.
4. This invention introduces the synthesis of MAX phases in air by suppressing the oxidation of material both at low and high temperature.
5. This technique synthesizes MAX phase in bulk for its extensive study in different applications and for the fabrication of excellent two-dimensional nano-material called "MXenes".

We claim:

1. A process for synthesis of a dense and pure MAX phase, comprising the following steps:

a) forming a mixture of a transition metal (M), a post-transition metal (A) and a non-metal (X) in a certain stoichiometric ratio, wherein the transition metal is titanium, wherein the post-transition metal is selected from tin and silicon, wherein the non-metal is carbon;

b) wet-milling the mixture in a solvent followed by vacuum drying to form a compact disc;

c) igniting exothermally the compact disc sandwiched between two flat graphite electrodes, to initiate combustion on an application of current having an electric field in a range of 20-60 V/cm, thereby promoting propagation of the combustion in an extremely short time;

d) terminating the application of current to obtain the MAX phase;

wherein the MAX phase is a three-dimensional (3D) layered transition metal carbides or nitrides or carbonitrides.

2. The process as claimed in claim 1, wherein the mixture has a M:A:X molar ratio of about 2:0.2-1.0:1 for synthesis of $Ti_2SnC$ as MAX phase.

3. The process as claimed in claim 1, wherein the mixture has a M:A:X molar ratio of about 3:1.0-1.8:2 for synthesis of $Ti_3SiC_2$ as MAX phase.

4. The process as claimed in claim 1, wherein a pressure of about 5 MPa to 30 MPa is employed onto the mixture to form a compact disc.

5. The process as claimed in claim 1, wherein pre-heating of the compacted disc is done in a range of 200-400° C.

6. The process as claimed in claim 1, wherein the application of current is in a continuous mode and is in an optimized range of 100-300 $mA/mm^2$.

7. The process as claimed in claim 1, wherein temperature of the compact disc during flash event is about 1200-1400° C. and duration of the flash sintering process is less than 10 seconds.

8. The process as claimed in claim 1, wherein the process is conducted in vacuum, or in an atmosphere of an inert gas.

9. The process as claimed in claim 1, wherein the process is conducted in air without oxidation of the transition metal, the post-transition metal and the non-metal.

10. The process as claimed in claim 1, wherein the MAX phase formed is grey in colour and is easily pulverizable.

* * * * *